United States Patent [19]

Baltz

[11] 4,089,425
[45] May 16, 1978

[54] SELF-LOADING TRAILER

[76] Inventor: Harold D. Baltz, Rte. #3, Box 228, Pocahontas, Ark. 72455

[21] Appl. No.: 592,207

[22] Filed: Jul. 1, 1975

[51] Int. Cl.² ............................................. B60P 1/04
[52] U.S. Cl. ................................ 214/1 HH; 214/352; 214/506
[58] Field of Search ................. 214/505, 506, 501, 78, 214/DIG. 4, DIG. 3, 350, 352, 130 R, 130 A, 130 C, 1 HH

[56] References Cited
U.S. PATENT DOCUMENTS

| 1,057,787 | 4/1913 | Voellinger | 214/352 |
| 2,418,522 | 4/1947 | Needham | 214/DIG. 3 |
| 2,534,868 | 12/1950 | Johnson | 214/506 |
| 3,450,281 | 6/1969 | Groberg | 214/501 X |
| 3,662,900 | 5/1972 | Grey et al. | 214/501 X |
| 3,938,682 | 2/1976 | Rowe | 214/501 X |
| 3,985,253 | 10/1976 | Kannady | 214/506 |

Primary Examiner—Albert J. Makay
Attorney, Agent, or Firm—Bacon & Thomas

[57] ABSTRACT

A self-loading trailer for handling heavy or large loads wherein the trailer includes a load cradle supported on wheels for tilting movement. An arm including a load engaging means is carried by the cradle for free pivotal movement with respect thereto when the cradle is tilted.

10 Claims, 8 Drawing Figures

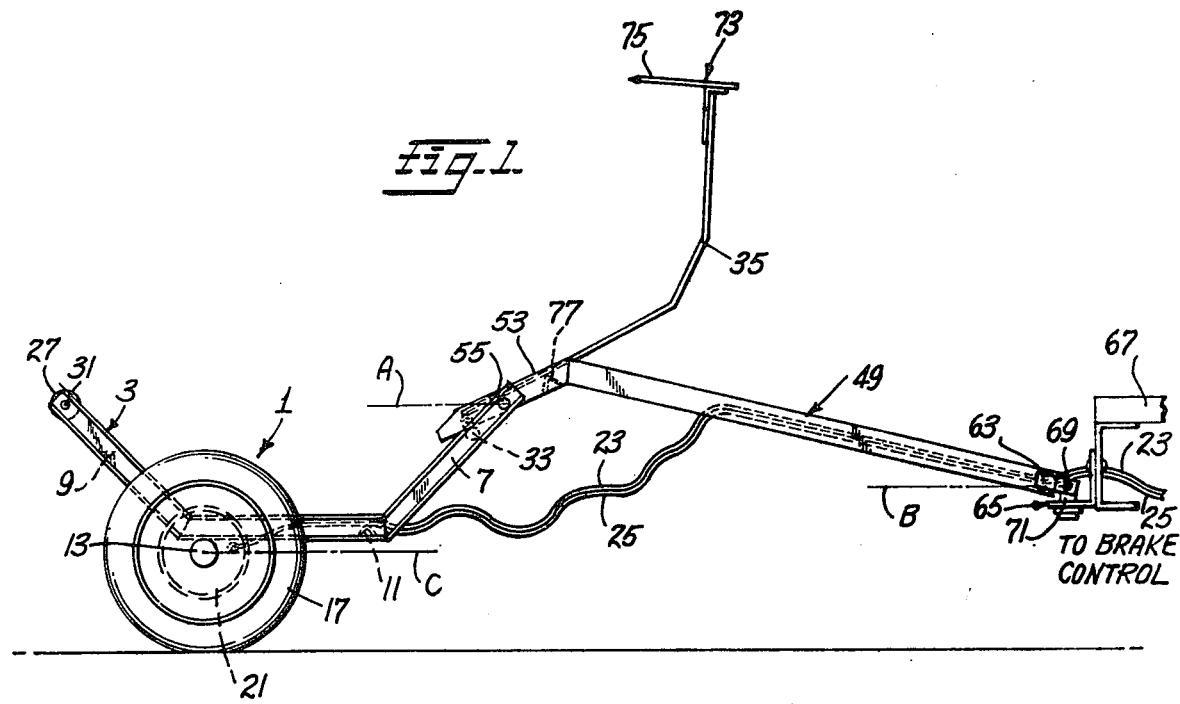
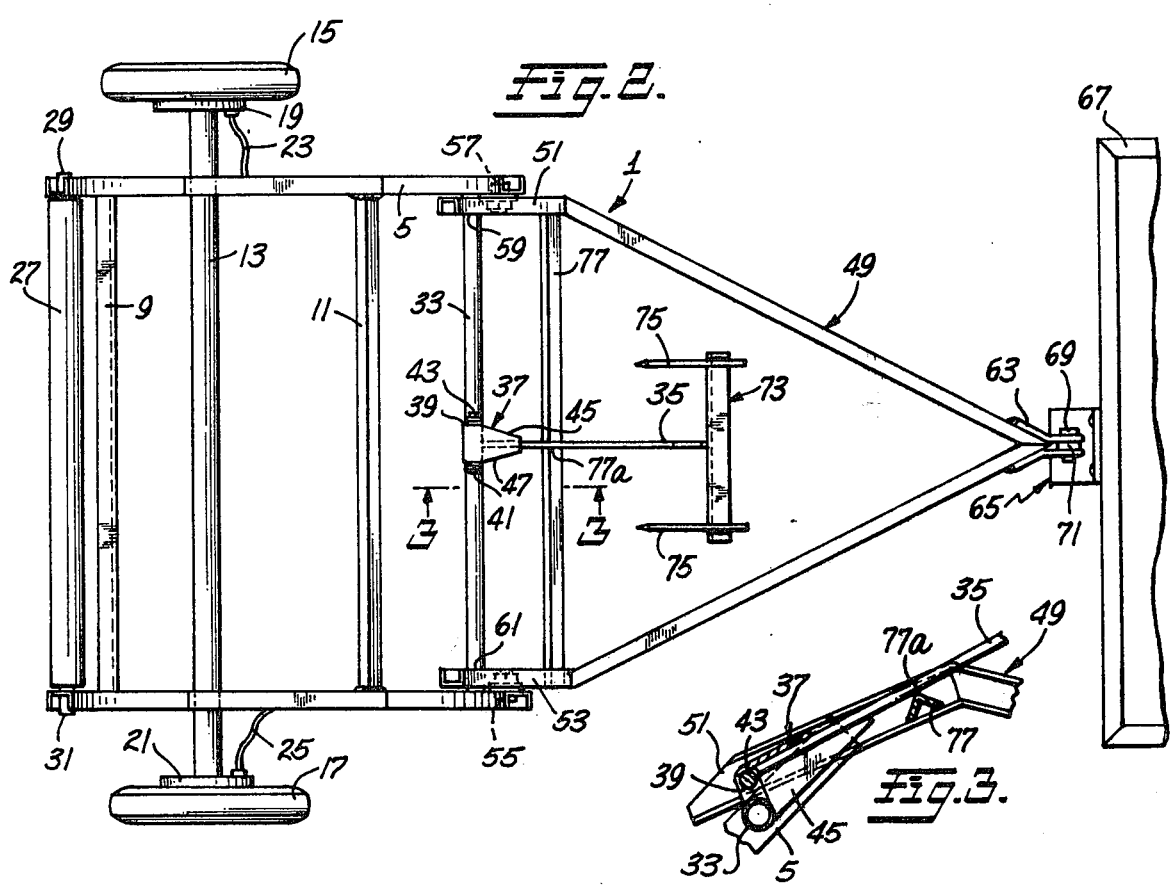

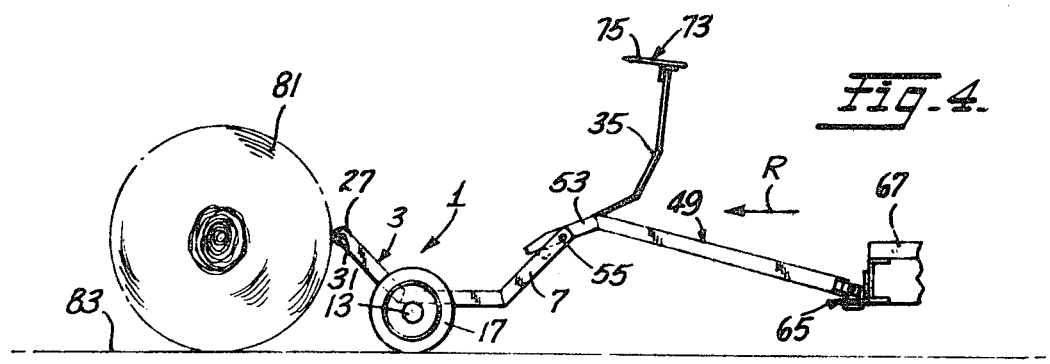
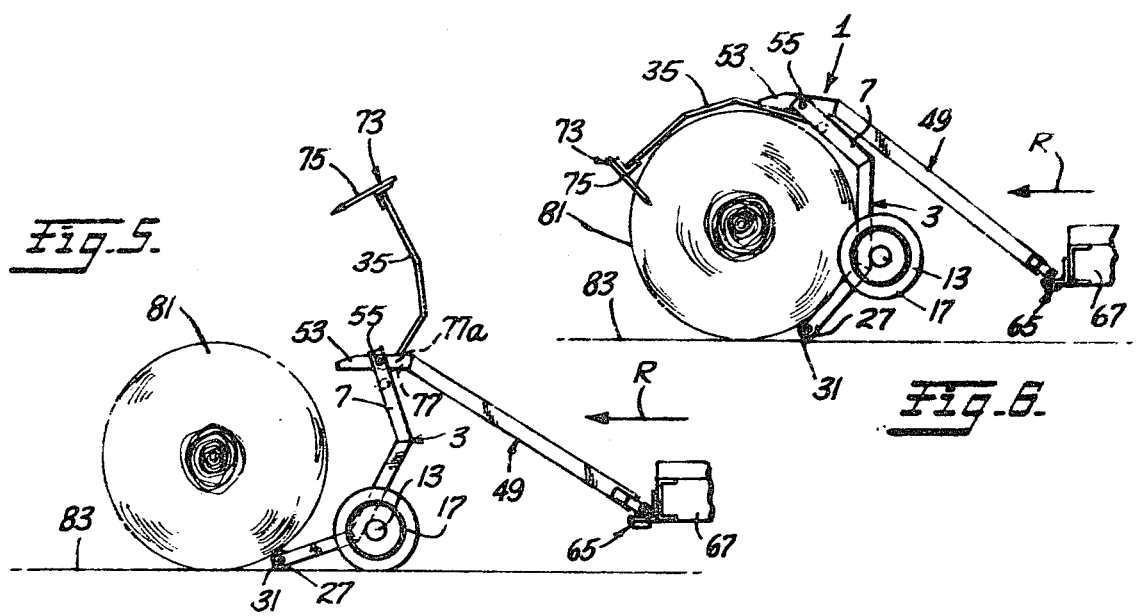
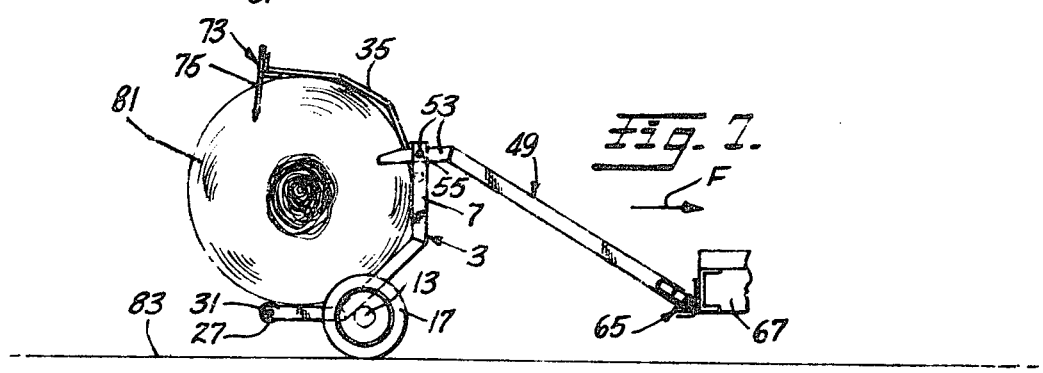
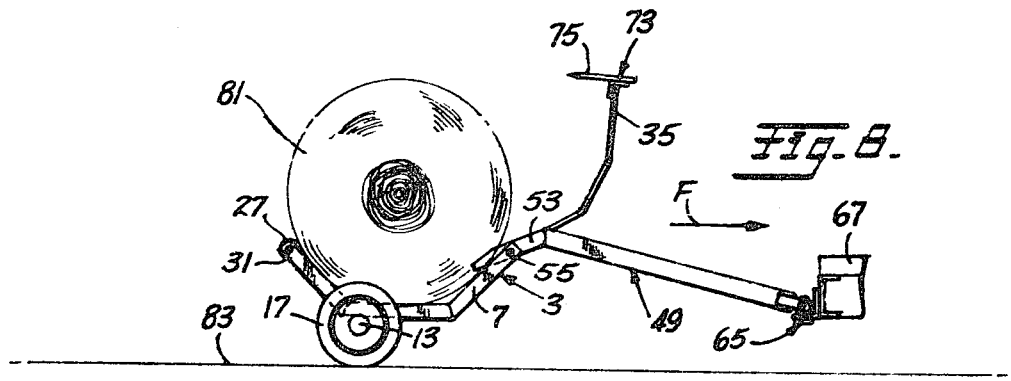

SELF-LOADING TRAILER

BACKGROUND OF THE INVENTION

1. Field of the Invention

This invention relates generally to the field of art which includes apparatus for handling a heavy or large load. More particularly, the present invention is directed to a trailer for loading, transporting, and depositing a heavy, large or otherwise bulky article or load.

2. Description of the Prior Art

The present prior art is rather active and replete with various vehicular apparatus and devices for use in handling loads of varying sizes, weights and configurations, particularly large or heavy loads. Such prior art apparatus and devices may take the form of a completely self-contained vehicle that is provided with a load handling mechanism, such as a forklift, and a power source for both actuating the mechanism and moving the vehicle so that the load can be transported to a desired location. Load handling apparatus of this type are normally expensive and complex to manufacture and maintain. Further, they are usually designed for specific job applications and cannot be easily utilized in diverse environments.

Another type of known vehicular load handling device is in the form of a manually-operated vehicle of fairly simple construction, such as a hand truck or the like. Such vehicles require human power to load, transport and unload articles handled thereby. By their very nature, such load handling vehicles are limited in their manner of use and application.

A yet another form of prior art vehicular apparatus for handling a load includes the category of trailers intended primarily for use in conjunction with a tow vehicle, the latter providing the power to transport the trailer to a desired location. More particularly, such trailers may also include various mechanisms carried thereon for the purpose of facilitating the handling of a large or heavy load. These mechanisms are usually in the form of a manually-operated device, such as a winch or clamp, which necessitates control and manipulation by an individual, usually the tow vehicle operator. This time consuming procedure requires the operator to leave the tow vehicle and secure the load onto the trailer before it can be transported. This operation is again repeated in a reverse manner after the trailer has been pulled to the desired location so that the load can be removed therefrom.

SUMMARY OF THE INVENTION

The present invention serves to overcome the basic disadvantages and deficiencies inherent in the aforementioned prior art apparatus utilized for handling heavy or large loads. This is achieved by providing an apparatus in the form of a self-loading trailer which includes a load cradle supported for free tilting movement by a wheeled axle. A load engaging means is carried by the cradle for free pivotal movement with respect thereto such that it may be actuated under the force of gravity to secure the load within the cradle by tilting the latter. It is therefore an object of the present invention to provide a self-loading trailer that can be utilized to handle a large or heavy load efficiently.

It is another object of the present invention to provide a self-loading trailer which is extremely simple in construction and economical to manufacture.

It is yet another object of the present invention to provide a self-loading trailer which is extremely simple in operation and can be used to load, transport and deposit a heavy or cumbersome load.

It is still yet another object of the present invention to provide a self-loading trailer which can be manipulated to handle a large or heavy load with a minimum of human manual assistance.

These and other objects of the present invention will be apparent from the following description and appended claims, reference being made to the accompanying drawings forming a part of this specification wherein like reference characters designate corresponding parts of the several views.

BRIEF DESCRIPTION OF THE DRAWINGS

FIG. 1 is a side elevational view of the self-loading trailer of the present invention;

FIG. 2 is a plan view of the self-loading trailer of FIG. 1;

FIG. 3 is an enlarged fragmentary vertical sectional view, taken along the line 3—3 of FIG. 2; and FIGS. 4 through 8 are diagrammatic views illustrating the sequential steps for handling a load by the self-loading trailer of the present invention.

DETAILED DESCRIPTION OF THE PREFERRED EMBODIMENT

Referring now to FIG. 1 and FIG. 2, a self-loading trailer 1 of the present invention includes a cradle 3 having a generally bowed or arcuate configuration for receiving a load therein. Cradle 3 may consist of a pair of arcuate-shaped side members 5 and 7 which are rigidly supported in parallel fashion by means of a rearward cross brace 9 and a forward cross brace 11. The lower portion of cradle 3 is supported on an axle 13 by any connection means well known in the art, such as by welding. A pair of wheels 15 and 17 are rotatably journaled at the opposite ends of axle 13 so that cradle 3 containing a load therein may be transported. Wheels 15 and 17 may also include a pair of brake means 19 and 21 associated respectively therewith so that wheels 15 and 17 can be braked or locked against rotation so that cradle 3 can be tilted in both the forward and rearward directions. Brakes 19 and 21 may be of any suitable type well known in the art and may be actuated by a pair of actuating lines 23 and 25, which lines may be either electrical or fluid in nature depending upon the type of brake mechanism utilized. It is highly desirable that actuation lines 23 and 25 be disposed for control at a location remote from cradle 3.

A ground engaging member 27 is carried at the rear portion of cradle 3 between arcuate side members 5 and 7. As more clearly shown in FIG. 2, member 27 may be in the form of a roller having its ends 29 and 31 rotatably journaled within the ends of side members 5 and 7. Alternatively, member 27 may be either a hollow or solid cylindrical body rigidly affixed between members 5 and 7 by means of welding or any other suitable attachment well known in the art.

A cross bar 33 is rigidly secured between members 5 and 7 at the front portion of cradle 3. An arm 35 is carried by cross bar 33 and extends substantially upwardly with respect to cradle 3 while the latter is in its position of travel as depicted in FIG. 1. Arm 35 is joined to cross bar 33 for free pivotal movement with respect thereto by means of a triangular-shaped bracket 37 which is attached between a pair of perpendicular flanges 39 and 41 by means of a pin assembly 43. Pin assembly 43 may be in the form of a nut and bolt combination or any other suitable fastening system well known in the art and deemed suitable for securing bracket 37 so that it may freely pivot with respect to flanges 39 and 41. As more clearly seen in FIG. 3, bracket 37 also includes a pair of downwardly depending reinforcing flanges 45 and 47 which are substantially triangular in configuration and abut perpendicular flanges 39 and 41 when arm 35 is in the position shown in FIG. 1.

A hitch frame 49 is also pivotally connected to the front portion of cradle 3. Hitch frame 49 may assume a generally triangular configuration and includes a pair of parallel leg sections 51 and 53 which are attached to the inner end portions of side members 5 and 7 through a pair of journal assemblies 55 and 57, for free pivotal movement with respect thereto. Assemblies 55 and 57 may be in the form of pins, nut and bolt combinations or any other suitable systems well knwon in the art for achieving the desired free pivotal movement attachment between hitch frame 49 and cradle 3. As more clearly shown in FIG. 2, parallel leg sections 51 and 53 bear against cross bar 33 at 59 and 61, respectively, when trailer 1 is in the transport position as shown in both FIGS. 1 and 2. The apex portion of triangular-shaped hitch frame 49 is provided with a suitable bracket 63 for connection to a trailer hitch assembly 65 that is carried by a tow vehicle generally shown as 67. Hitch assembly 65 may include a horizontal cross pin 69 and a vertical support pin 71. In this manner, hitch frame 49 may be permitted to pivot vertically about horizontal cross pin 69 and laterally or horizontally about vertical support pin 71. However, it is to be understood that this embodiment of hitch assembly 65 is purely exemplary and any other prior art hitch assembly suitable for both vertical and horizontal pivoting movements of hitch frame 49 may also be utilized in the practice of the present invention. An example of such prior art hitch assemblies may be those of the universal joint variety which permit pivoting movements of the hitch frame with respect to the hitch assembly in almost any given direction. As is also shown in FIG. 1, actuation lines 23 and 25 for operating brake means 19 and 25, respectively, may be located adjacent portions of hitch frame 49 and passed around hitch assembly 65 into tow vehicle 67 for operational control therefrom.

As seen in FIG. 1, arm 35 is disposed in a substantially upward direction with respect to cradle 3 when trailer 1 is in a transport position. A load engaging means 73, which means may include a plurality of sharp forks or tines 75, is rigidly secured adjacent the uppermost end of arm 35. By virtue of the somewhat curved configuration of arm 35 and the weight of load engaging means 73 carried adjacent the uppermost end thereof, arm 35 is disposed under the force of gravity to rest against a cross brace member 77 at 77a, which member 77 is secured between parallel leg sections 51 and 53 of hitch frame 49, when the trailer 1 is in its normal transport position as shown in FIG. 1.

As shown in FIG. 1, trailer 1 is in its normal transport position with arm 35 resting against cross brace 77 at 77a and extending substantially upwardly from cradle 3. In this transport position, the three main points of pivotal movement about horizontal axes include the connection between hitch frame 49 and cradle 3 at 55 and 57, the connection between hitch frame 49 and hitch assembly 65 at 69 and the connection between cradle 3, axle 13 and wheels 15 and 17. These three horizontal axes are parallel to each other and disposed in horizontal planes A, B and C, respectively, such that plane A assumes the highest elevation, plane C the lowest and plane B is disposed intermediate therebetween.

It is to be understood that trailer 1 may be constructed from any materials and by any methods well known in the art and found suitable for the operation and purpose intended for trailer 1. For example, side members 5 and 7, rearward cross brace 9, forward cross brace 11, cross brace 77 and hitch frame 49 may be formed from steel in angle or channel shape and welded or bolted together. The remaining parts may also be formed from steel or other suitable material and secured together in a similar manner.

BASIC MODE OF OPERATION

Referring now to FIGS. 4 through 8, there is depicted a sequence of the operational steps for handling a load 81 resting on ground surface 83. Though load 81 is depicted as a large cylindrical bale of hay, it is to be understood that any heavy or bulky load can also be handled by the self-loading trailer of the present invention.

In the first step of handling load 81, trailer 1 is backed rearwardly in the direction indicated at R by tow vehicle 67 to a position adjacent load 81 as shown in FIG. 4. Brakes 19 and 21 are actuated through lines 23 and 25 from a remote operational control point located within tow vehicle 67. With the wheels 15 and 17 braked or locked against rotation, tow vehicle 67 is then backed rearwardly towards load 81. Because of the spaced vertical dispositions of the three pivotal axes as represented by planes A, B and C, cradle 3 is caused to tilt rearwardly towards load 81 by hitch frame 49. This is clearly shown in FIG. 5 wherein ground engaging member 27 has contacted ground 83. At this point, member 27 and wheels 17 and 19 are simultaneously in contact with ground 83 and arm 35 remains against cross brace 77 at point 77a.

Upon continued backward movement of tow vehicle 67, wheels 17 and 19 are lifted off of the surface of ground 83 because cradle 3 then pivots about member 27 in contact with ground 83. During this stage, arm 35 pivots under the force of gravity rearwardly onto load 81 so that load engaging means 73 secures load 81 through forks or tines 75. It can be noted in FIG. 6 that cradle 3 effectively encloses and surrounds load 81 which is secured by arm 35 and load engaging means 73.

With load 81 secured in the position shown in FIG. 6, tow vehicle 67 is then driven forwardly in the direction indicated at F. Cradle 3 then pivots about member 27 in the forward direction and wheels 17 and 19 are lowered back upon ground 83 as shown in FIG. 7. Because load 81 is secured by means of forks or tines 75, it is held firmly within cradle 3 during the forward movement of tow vehicle 67, which movement causes cradle 3 to tilt forwardly about axle 13 and wheels 15 and 17.

As seen in FIG. 8, continued forward movement of tow vehicle 67 causes arm 35 to pivot forwardly under the force of gravity, thereby removing forks or tines 75 from load 81 and releasing the latter to rest freely within cradle 3. Arm 35 then contacts cross brace 77 and rests thereon at 77a during continued forward movement of both the tow vehicle and trailer 1 during transport of load 81. The position of trailer 1 in FIG. 8 is exactly that shown in FIG. 1.

The unloading of load 81 once trailer 1 has been brought to the desired location by means of tow vehicle 67 is essentially the reverse procedure described above for loading trailer 1. In unloading, brakes 19 and 21 are actuated to lock wheels 15 and 17. Tow vehicle is then backed rearwardly so that cradle 3 is tilted about axle 13 and wheels 15 and 17. Continued backward movement of tow vehicle 67 then causes bale 81 to roll out of cradle 3. This is achieved prior to arm 35 leaving its contact with cross brace 77 at 77a due to the weight of load 81. Once load 81 has been removed in this manner, tow vehicle 67 is driven forwardly and cradle 3 then tilts about axle 13 and wheels 15 and 17 to assume the transport position as depicted in FIGS. 1 and 8.

Though the above loading and unloading operations of trailer 1 have been described in conjunction with tow vehicle 67, it is entirely possible that such operations be conducted manually when the load is of such suitable size and weight to warrant manual manipulation.

It is to be understood that the form of the invention herewith shown and described is to be taken as a preferred example of the same, and that various changes in shape, size and arrangement of parts may be resorted to, without departing from the spirit of the invention or scope of the subjoined claims.

What is claimed is:

1. A self-loading trailer for handling a load, which trailer comprises, in combination:
   a. a load cradle having a front portion, a rear portion and a cross bar carried by the front portion;
   b. wheel means supporting the cradle through a first pivotal axis for tilting the cradle in both the forward and rearward directions;
   c. a load engaging arm carried by the cross bar for free pivotal movement with respect to the front portion of the cradle;
   d. a hitch frame having a first end pivotally connected to the front portion of the cradle through a second pivotal axis and a second end for connecting to a tow vehicle through a third pivotal axis wherein, when the trailer is being pulled in a forward direction;
      1. the horizontal plane within which the second pivotal axis is located is disposed above the cross bar, and
      2. the horizontal plane within which the third pivotal axis is located is disposed above the horizontal plane within which the first pivotal axis is located;
   e. the hitch frame including at least one leg portion extending substantially rearwardly of the second pivotal axis for bearing downwardly against the cross bar and stopping the forward tilting movement of the cradle, with the second pivotal axis being disposed intermediate the leg portion and the second end of the hitch frame; and
   f. a cross brace for supporting the pivotal arm in a substantially upwardly extending position, which cross brace is carried by the first end of the hitch frame and is disposed forwardly of and above the cross bar when the trailer is being pulled in a forward direction.

2. The trailer of claim 1 wherein the load engaging arm includes:
   a. a free terminal end, and
   b. a load engaging means carried by the free terminal end.

3. The trailer of claim 2 wherein the load engaging means includes a plurality of tines.

4. The trailer of claim 1 wherein the rear portion of the cradle includes means for engaging the ground surface.

5. The trailer of claim 4 wherein the ground engaging means includes a cylindrical-shaped roller.

6. The trailer of claim 1 wherein the wheel means includes:
   a. an axle,
   b. a wheel rotatably carried adjacent each end of the axle, and
   c. brake means for locking the wheels against rotation during tilting of the cradle.

7. The trailer of claim 1 wherein the cradle is of a substantially arcuate configuration.

8. The trailer of claim 1 wherein the second end of the hitch frame includes means for detachably connecting the hitch frame to the tow vehicle.

9. The trailer of claim 1 wherein the hitch frame includes two leg portions.

10. The trailer of claim 9 wherein the two leg portions are each of a substantially elongate configuration and have substantially parallel longitudinal axes.

* * * * *